US008484394B2

(12) United States Patent
Hubo et al.

(10) Patent No.: US 8,484,394 B2
(45) Date of Patent: Jul. 9, 2013

(54) USB DEVICE ELECTION OF BECOMING A HOST AFTER RECEIVING INFORMATION ABOUT DEVICE CAPABILITY OF THE HOST

(75) Inventors: Michael Hubo, Hattingen (DE); Thomas Block, Wuppertal (DE); Daniel Bencak, Dortmund (DE); Christian Zechlin, Herne (DE)

(73) Assignee: Nokia Corporation, Espoo (FI)

( * ) Notice: Subject to any disclaimer, the term of this patent is extended or adjusted under 35 U.S.C. 154(b) by 272 days.

(21) Appl. No.: 12/226,807

(22) PCT Filed: Apr. 26, 2006

(86) PCT No.: PCT/IB2006/051304
§ 371 (c)(1),
(2), (4) Date: Jun. 16, 2009

(87) PCT Pub. No.: WO2007/122453
PCT Pub. Date: Nov. 1, 2007

(65) Prior Publication Data
US 2009/0300239 A1 Dec. 3, 2009

(51) Int. Cl.
*G06F 13/12* (2006.01)
*G06F 13/20* (2006.01)

(52) U.S. Cl.
USPC ............................................ 710/63; 710/313

(58) Field of Classification Search
USPC ................................................... 710/63, 313
See application file for complete search history.

(56) References Cited

U.S. PATENT DOCUMENTS

| | | | | |
|---|---|---|---|---|
| 6,732,218 B2* | 5/2004 | Overtoom et al. | ............ | 710/313 |
| 7,413,129 B2* | 8/2008 | Fruhauf | ......................... | 235/492 |
| 7,707,348 B2* | 4/2010 | Huotari et al. | ................ | 710/313 |
| 2002/0035621 A1* | 3/2002 | Zintel et al. | ................... | 709/220 |
| 2003/0046447 A1* | 3/2003 | Kouperchliak et al. | ....... | 709/321 |
| 2004/0019732 A1* | 1/2004 | Overtoom et al. | ........... | 710/313 |
| 2005/0091437 A1* | 4/2005 | Yang et al. | .................... | 710/313 |
| 2005/0204072 A1 | 9/2005 | Nakagawa | | |
| 2006/0080490 A1* | 4/2006 | Tang | ............................. | 710/313 |
| 2006/0095642 A1* | 5/2006 | Hesse et al. | ................... | 710/313 |

(Continued)

FOREIGN PATENT DOCUMENTS

| | | |
|---|---|---|
| EP | 1221653 | 7/2002 |
| WO | WO 99/01820 | 1/1999 |
| WO | WO9901820 | 1/1999 |
| WO | WO 03/012577 | 2/2003 |

OTHER PUBLICATIONS

John Hyde, USB Multi-Role Device Design by Example, 2003, Cypress.*

(Continued)

*Primary Examiner* — Hyun Nam
(74) *Attorney, Agent, or Firm* — Locke Lord LLP (57) ABSTRACT

In the case of a universal serial bus (USB) connection, a host detects a connection of a peripheral to the host via a USB interface of the host. The host then generates an informative command, which includes information on capabilities of the host. This informative command is provided for transmission via the USB interface to the peripheral. The peripheral receives the informative command and may for instance evaluate the included information for selecting a suitable USB mode that is to be entered or for deciding on becoming a host itself. Alternatively or in addition, the host may generate a request command for retrieving information on all classes offered in all USB modes of a peripheral.

29 Claims, 2 Drawing Sheets

U.S. PATENT DOCUMENTS

2006/0129700 A1* 6/2006 Bopardikar ............... 710/2
2007/0173270 A1* 7/2007 Block et al. ............... 455/507
2007/0245055 A1 10/2007 Minami
2010/0040041 A1* 2/2010 Zechlin et al. ............ 370/347

OTHER PUBLICATIONS

USB Implementers Forum; "On-The-Go Supplement to the USB 2.0 Specification;" Jun. 24, 2003; USB Implementers Forum; XP002423448; pp. 3-7 and pp. 50-61.

Universal Serial Bus Specification; Revision 2.0, Apr. 27, 2000 by Compaq, Hewlett-Packard, Intel, Lucent, Microsoft, NEC and Philips; whole document.

European Search Report of European App. No. EP 12159228—Date of Completion of Search: May 3, 2012, 4 pages.

"Universal Serial Bus Specification", Compaq, Hewlett-Packard, Intel, Lucent, Microsoft, NEC, Philips, XP-002674982, Revision 2.0, Apr. 27, 2000, pp. cover, ii, 22-24 and 239-245.

"On-The-Go Supplement to the USB 2.0 Specification", Revision 1.0a, Jun. 24, 2003, pp. cover, ii-vi and 1-69.

* cited by examiner

USB DEVICE ELECTION OF BECOMING A HOST AFTER RECEIVING INFORMATION ABOUT DEVICE CAPABILITY OF THE HOST

CROSS REFERENCE TO RELATED APPLICATIONS

This application is the U.S. National Stage of International Application Number PCT/IB2006/051304 filed on Apr. 26, 2006 which was published in English on Nov. 1, 2007 under International Publication Number WO 2007/122453.

FIELD OF THE INVENTION

The invention relates to methods, to processing arrangements, to devices, to systems, to software program codes and to software program products supporting universal serial bus (USB) connections.

BACKGROUND OF THE INVENTION

The document "Universal Serial Bus Specification", Revision 2.0, Apr. 27, 2000 by Compaq, Hewlett-Packard, Intel, Lucent, Microsoft, NEC and Philips defines an industry-standard USB, which enable an easy to use connection between a personal computer (PC) acting as a host and another device acting as a PC peripheral. Host and peripheral may be interconnected by a USB cable. The host is responsible for initiating all data transactions between host and peripheral, while the peripheral responds to bus requests from the host.

According to the USB specification, a host obtains information about the functions supported by a peripheral during an enumeration process. When connecting a peripheral to a host, the peripheral will announce in this enumeration process more specifically all USB classes and interfaces it provides in its current USB mode. The term USB mode is used in the present document to define a state of a device in which it supports a predetermined set of USB classes and/or interfaces. A class identifies a function provided by the peripheral, for example a keyboard function, a printer function or a mass storage function, etc. A composite or compound peripheral may provide a plurality of different classes. Thus, in different USB modes of the peripheral, the host may access different functions of the peripheral. An interface is a related set of endpoints that present a single feature or function of the peripheral to the host. The protocol used to communicate with this related set of endpoints and the purpose of each endpoint within the interface may be specified as part of a device class or vendor-specific definition. A mobile phone with three different USB modes, for example, may support in a first USB mode "Mode 1" a Wireless Mobile Communication (WMC) OBject EXchange (OBEX) interface, a MODEM interface, and some proprietary interfaces. It may further support in a second USB mode "Mode 2" only an Mass Storage Class (MSC) interface. It may further support in a third USB mode "Mode 3" only a Still Image Capture Device (SICD) interface, for instance as a base for Picture Transfer Protocol (PTP) and PictBridge or Media Transfer Protocol (MTP).

It is a disadvantage of the USB standard that the peripheral only announce the classes and interfaces that are supported in the current USB mode of the peripheral. The host may only detect other functions of a peripheral by starting the connection setup again. In the scope of this new setup, the peripheral may then possibly announce another set of classes in a new enumeration process. In an alternative approach for detecting additional classes of a peripheral, a user query may be used. In such a user query, a user may be asked which function of the peripheral should be used, and this function is then announced to the host on the USB bus.

In the USB specification, a device can moreover be only a host or only a peripheral. The fixed role of a device can also be identified by its connector, as USB cables have different plugs on their two ends. A host has more specifically a Standard A receptacle and a peripheral has more specifically a Standard B receptacle. This approach is well suited for a computer environment, which USB was originally designed for. Here, the PC is always the host, and devices that are connected to the PC are always peripherals. Peripherals provided with a USB interface could also benefit from an interaction among each other, though.

A more flexible use of a USB connection is enabled by the "On-The-Go Supplement to the USB 2.0 Specification", Revision 1.0a, Jun. 23, 2003. The USB On-The-Go (OTG) additions to the USB standard allow USB connectivity for devices, which do not have such a clear host or peripheral role as a PC and a memory card reader. Dual-role devices typically perform multiple functions, like a mobile phone, a personal digital assistant (PDA), or a digital camera. For example, a mobile phone might have to be a peripheral providing a class "mass storage" when connected to a PC, while it might have to be a host when connected to a printer or an external keyboard etc.

Based on the USB-OTG, a clear host device may have a Standard-A receptacle or a Mini-A receptacle, while a clear peripheral device may have a Standard-B receptacle or a Mini-B receptacle. In addition an OTG device has a Mini-AB receptacle, the latter enabling a connection of either a Mini-A plug for hosts or a Mini-B plug for peripherals. An OTG device must further support a limited host capability and a specified Host Negotiation Protocol (HNP). In USB-OTG, the respective role of the involved devices is thus assigned by the USB cable as well. However, if the connected devices are OTG devices, a role switch can be performed after the connection has been established based on the HNP.

Still, if a user connects two USB-OTG devices, the only function or set of functions that can be performed is the one that is associated to the class or the set of classes announced by the device to which the peripheral role was assigned by the way the user connected the USB cable. If the user desires to make use of a different function or set of functions, he/she may trigger a "disconnect-reconnect", for example by means of a user input through a user interface, hoping that the peripheral would announce a second class or set of classes. Alternatively, the user might cause a "role switch" based on the HNP, hoping that the former host would then announce the desired class or set of classes in the peripheral role.

SUMMARY OF THE INVENTION

It is an object of the invention to improve the usability of USB connections between two devices. It is in particular an object of the invention to improve the user experience during a USB connection.

A first method is proposed for a host side of a USB connection. The method comprises generating at a host, which is connected via a USB interface of the host to a peripheral, an informative command, the informative command including information on capabilities of the host. The method further comprises providing the informative command for transmission via the USB interface to the peripheral.

Moreover, a first processing arrangement is proposed, which is adapted to generate an informative command, the informative command including information on capabilities of a host, which is connected via a USB interface of the host to a peripheral. The first processing arrangement is further adapted to provide the command for transmission via the USB interface to the peripheral.

It has to be noted that this processing arrangement can be implemented in hardware and/or in software. It could comprise for instance software program code that is executed by a processing unit or a chip or chipset comprising a circuit, which realizes corresponding functions.

Moreover, a first device is proposed, which comprises a USB interface enabling the device to act as a host in a USB connection with another device acting as a peripheral, and which comprises the proposed first processing arrangement.

Moreover, a first software program code is proposed, which is adapted to realize the steps (actions) of the proposed first method when being executed by a processing unit of a host.

Moreover, a first software program product is proposed, in which the proposed first software program code is stored in a readable memory. Such a software program product can be for instance a separate storage device or a memory that is to be implemented in a device providing the host functionality.

In addition, a second method is proposed for a peripheral side of a USB connection. The second method comprises receiving at a peripheral an informative command from a host including information on capabilities of the host, the peripheral being connected via a USB interface of the peripheral to the host.

Moreover, a second processing arrangement is proposed, which is adapted to receive at a peripheral an informative command from a host including information on capabilities of the host, the peripheral being connected via a USB interface of the peripheral to the host. The received information may be used by the processing arrangement as a basis for a decision.

Moreover, a second device is proposed, which comprises a USB interface enabling the device to act as a peripheral in a USB connection with another device acting as a host, and which comprises the proposed second processing arrangement.

Moreover, a second software program code is proposed, which is adapted to realize the steps of the proposed second method when being executed by a processing unit of a peripheral.

Moreover, a second software program product is proposed, in which the proposed second software program code is stored in a readable memory. Such a software program product can be for instance a separate storage device or a memory that is to be implemented in a device providing the peripheral functionality.

Finally, a system is proposed, which comprises the proposed first device and a further device acting as a peripheral.

The invention proceeds from the consideration that it would be beneficial if the peripheral knew the USB functions supported by the host device. It is therefore proposed that a host that is linked by a USB connection to a peripheral informs the peripheral about its capabilities. These capabilities can relate to services that may be requested by the host as well as to services that may be provided by the host when acting as a peripheral.

It is an advantage of the invention that the peripheral automatically obtains knowledge about the USB capabilities of the host. This enables the peripheral for example to select a USB mode, which fits best to the requirements of the host. Further, it enables the peripheral for example to decide whether it may be interested in switching the roles of host and peripheral in order to take advantage of USB services offered by the current host.

The host may generate the indicated informative command for example upon detection of a connection to a peripheral, but equally independently of a detection of such a connection. The host may detect a connection when it is new or at any other time.

The information on capabilities of the host included in the informative command may comprise an indication of at least one class supported in at least one USB mode of the host and/or an indication of at least one interface offered for at least one USB mode of the host. Advantageously, all classes and all interfaces in all USB modes of the host are indicated in the informative command, in order to provide comprehensive information to the peripheral.

Conventionally, a host is also not able to select a USB mode that is to be entered by the peripheral. Since the host is not aware of the classes and interfaces the peripheral may support when operating in other USB modes than the current USB mode, a USB mode selection can only be done on peripheral side but never on host side. That is, the host is not able to force the peripheral into a particular USB mode.

According to an embodiment of the invention, in contrast, the host may generate in addition a request command. The request command may be used for retrieving an indication of all classes, and optionally all interfaces, offered in all USB modes of the peripheral. The request command may then equally be provided for transmission via the USB interface to the peripheral.

On the host side, this allows forcing the peripheral into a particular USB mode, which may suit best for the capabilities or the current USB mode or the current requirements of the host. The host may select to this end a desired USB mode of the peripheral based on the retrieved indication of all classes offered in all USB modes of the peripheral. The host may then generate a set command for forcing the peripheral into a selected USB mode and provide the set command for transmission via the USB interface to the peripheral. The peripheral might confirm whether it received a set command and/or whether it entered an indicated USB mode by a corresponding message to the host.

The informative command, the request command and the set command are advantageously generated at the host before a get command is generated at the host for obtaining information on at least one class offered by the peripheral in a current USB mode of the peripheral. Such a get command can be for instance a standard Get Device Descriptor command. If the peripheral does not obtain an informative command, a request command or a set command before it receives the Get Device Descriptor command, it will know that these commands are not supported at the host side or at least not used for a current USB session. The peripheral may then act in a conventional manner upon receipt of the get command.

It has to be noted, though, that there is no restriction at all when to use the informative command, the request command and the set command. They can be used at any other time as well. Still, when sending them before any other USB command, the peripheral can directly show the new configuration, which might prevent the necessity of a disconnect and connect operation.

The informative command, the request command and the set command can but do not have to be vendor specific commands.

Conventionally, a peripheral is not aware which classes and interfaces a host supports. If the peripheral knows the classes, which are supported by the host, in contrast, it may enter a supported USB mode automatically and enumerate the classes and interfaces in the supported USB mode without user interaction. Alternatively or in addition, the peripheral could enumerate the provided USB modes which fit best to the classes supported by the host. For example, if a common functionality between two devices is "mass storage", the devices could easily detect a feasible combination. If one of the devices supports in addition only a "printing" class, and the other device supports in addition only an "input device" class, moreover no other suitable combinations can be found. Consequently, the correct combination could be detected at the peripheral by a simple logic and a user does not have to be bothered with selecting a function.

According to an embodiment of the invention, the peripheral has several options for selecting a USB mode that is to be entered. The USB mode may be selected based on the received information on capabilities of the host. There may be for instance exactly one USB mode of the peripheral, which is suited to offer a useful service to the particular host. The USB mode may further be selected based on a set command from the host for forcing the peripheral into a particular USB mode. These options for an automatic selection improve the user experience, as they limit the need for a user input. If the peripheral is not able to select a particular USB mode automatically, it can still take some action to let the user decide to select a USB mode. In this case, the USB mode may be selected based on the user input.

The invention can be employed for any device supporting USB. The host may be a device, which can only assume the role of a host, and the peripheral may be a device, which can only assume the role of a peripheral. Alternatively, at least one of the host and the peripheral could be an OTG device, to which the role of a host or of a peripheral can be assigned. It is to be understood that in this case, all functions described for the end of a host could be implemented in addition at the end of an OTG peripheral and that all functions described for the end of a peripheral could be implemented in addition at the end of an OTG host.

Conventionally, a role switch between a host and a peripheral is rendered difficult by the fact that the USB standard does not enable the current peripheral to obtain knowledge about the capabilities of the current host, neither for the services it may request in its host-role nor for the services it may offer in a peripheral-role.

According to an embodiment of the invention, in contrast, the current peripheral may further determine whether to become a host based on the received information on capabilities of the current host.

In one embodiment of the invention, the proposed service discovery is defined in the form of a protocol.

It is to be understood that all described functions can be implemented in the proposed system, processing arrangements, devices, software program codes and software program products.

The supported classes on host side and on peripheral side can comprise any class that is suited for supporting a service over a USB connection, like a keyboard class or another input device class, a printer class, for instance a PictBridge class enabling a digital camera to print an image directly via a printer, a SICD class or another imaging class, a mass storage class, an audio or video output class, etc.

It is further to be understood that the USB connection between a host and a peripheral could be a connection via a USB cable, but it could also be some kind of a wireless connection which provides an access to the USB of the peripheral on the one hand and to the USB of the host on the other hand.

For a second aspect of the invention, a method is proposed, which comprises generating at a host, which is connected via a USB interface of the host to a peripheral, a request command, the request command retrieving information on all classes offered in all USB modes of the peripheral. The method further comprises providing the request command for transmission via the USB interface to the peripheral.

For the second aspect of the invention, moreover a processing arrangement is proposed, which is adapted to generate at a host, which is connected via a USB interface of the host to a peripheral, a request command, the request command retrieving information on all classes offered in all USB modes of the peripheral. This processing arrangement is further adapted to provide the request command for transmission via the USB interface to the peripheral.

For the second aspect of the invention, moreover a device is proposed, which comprises a USB interface enabling the device to act as a host in a USB connection with another device acting as a peripheral, and which comprises the processing arrangement proposed for the second aspect of the invention.

For the second aspect of the invention, moreover a software program code is proposed, which is adapted to realize the steps of the method proposed for the second aspect of the invention when being executed by a processing unit of a host.

For the second aspect of the invention, moreover a software program product is proposed, in which the software program code proposed for the second aspect of the invention is stored in a readable memory. Such a software program product can be for instance a separate storage device or a memory that is to be implemented in a device providing the host functionality.

For the second aspect of the invention, finally a system is proposed, which comprises the device proposed for the second aspect of the invention and a further device acting as a peripheral.

The request command can thus be generated as well independently from the generation of an informative command.

In one embodiment of the second aspect of the invention, the host may select a desired USB mode of the peripheral based on the retrieved information on all classes offered in all USB modes of the peripheral. The host may then generate a set command for forcing the peripheral into a selected USB mode, and provide the set command for transmission via the USB interface to the peripheral.

It is to be understood that the method, the processing arrangement, the device, the software program code, the software program product and the system of the second aspect of the invention can be implemented in accordance with or be combined with any embodiment presented for the first aspect of the invention.

BRIEF DESCRIPTION OF THE FIGURES

Other objects and features of the present invention will become apparent from the following detailed description considered in conjunction with the accompanying drawings.

DETAILED DESCRIPTION OF THE INVENTION

Figure 1:
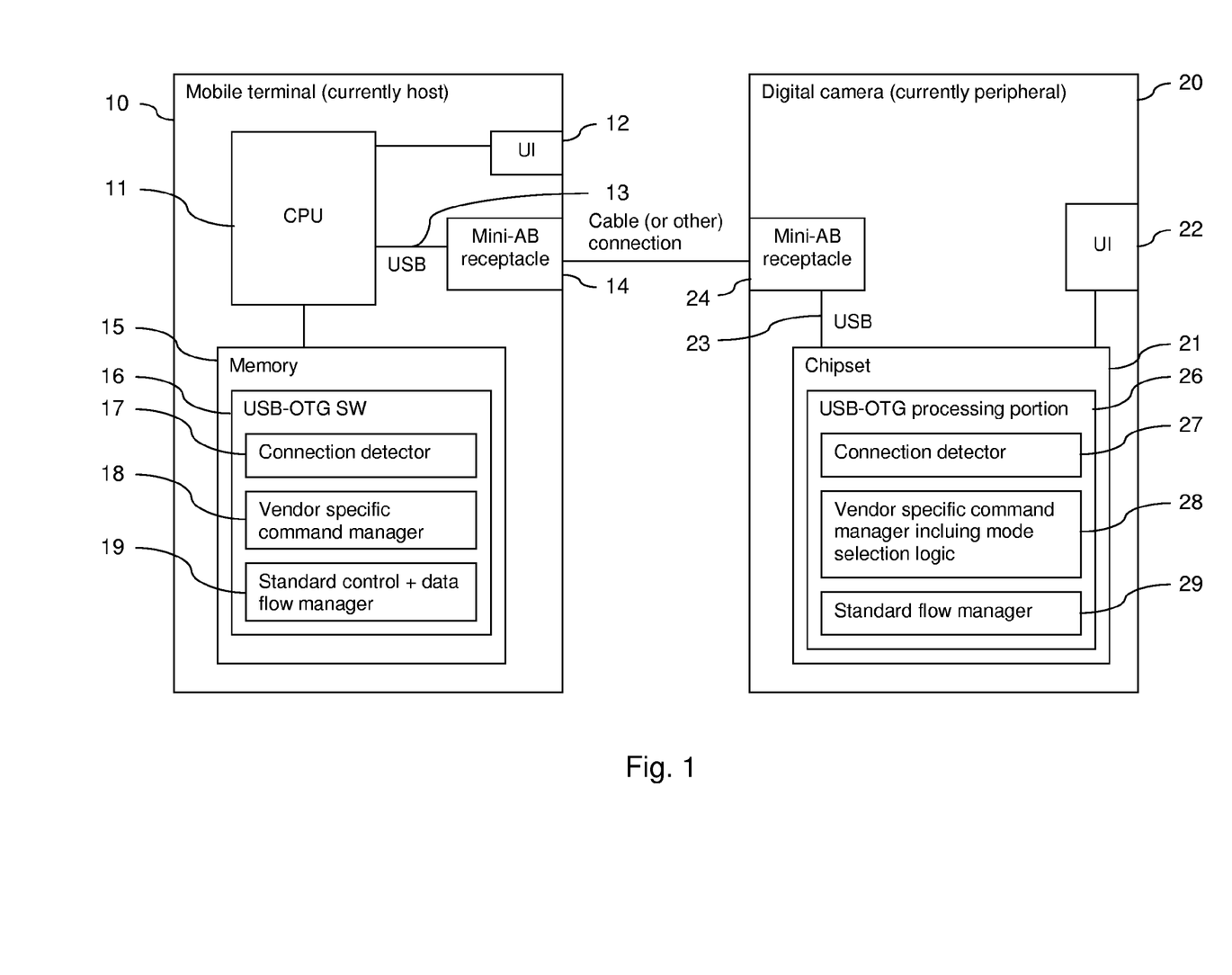
FIG. 1 is a schematic diagram of a system according to an embodiment of the invention.

FIG. 1 is a schematic diagram of a system which enables an improved usability of USB connections between two devices in accordance with an exemplary embodiment of the invention.

The system comprises a first device 10, which may be for instance a mobile terminal, and a second device 20, which may be for instance a digital camera. It is to be understood that the devices 10, 20 could be various other types of devices as well, like a PDA or a PC, etc.

The mobile terminal 10 comprises a CPU 11. The CPU 11 is connected to a user interface 12 of the mobile terminal 10, including for instance a display and a keypad, etc. The CPU 11 is further connected via a USB 13 to a USB interface 14 of the mobile terminal 10, by way of example a Mini-AB receptacle. The CPU 11 is moreover connected to a memory 15 of the mobile terminal 10.

The CPU 11 is adapted to execute various software program codes implemented in the mobile terminal 10. These software program codes may be stored for example in the memory 15, which can be accessed by the CPU 11. The memory 15 may comprise for instance a USB-OTG software program code 16 for execution by the CPU 11. The USB-OTG software program code 16 is responsible for managing any USB connection of the mobile terminal 10 to another device. The USB-OTG software program code 16 includes to this end a connection detector portion 17, a vendor specific command manager portion 18, a standard control and data flow manager portion 19 and other conventional USB-OTG software program code portions (not shown).

It is to be understood that the mobile terminal 10 comprises various other components not shown.

The digital camera 20 comprises a user interface 22 including a display and associated buttons, etc. Moreover, the digital camera 20 comprises as well a USB interface 24, by way of example a Mini-AB receptacle. The USB interface 24 is connected via a USB 23 to a chipset 21 or a chip. The chipset 21 realizes the same functions as the portions of the USB-OTG software program code 16. The chipset 21 comprises to this end a USB-OTG processing circuit 26 with a connection detector portion 27, a vendor specific command manager portion 28, a standard control and data flow manager portion 29 and other conventional USB-OTG processing components (not shown). It is to be understood that alternatively, the digital camera 20 could equally comprise a CPU and a memory corresponding to those of the mobile terminal 10. The different implementation was only selected for illustrating that the invention may be implemented in different ways.

The chipset 21 is also linked directly or indirectly to the user interface 22.

It is to be understood that the digital camera 20 comprises various other components not shown.

An operation according to an embodiment of the invention in the system of FIG. 1 will now be described with reference to the message flow chart of FIG. 2.

Figure 2:
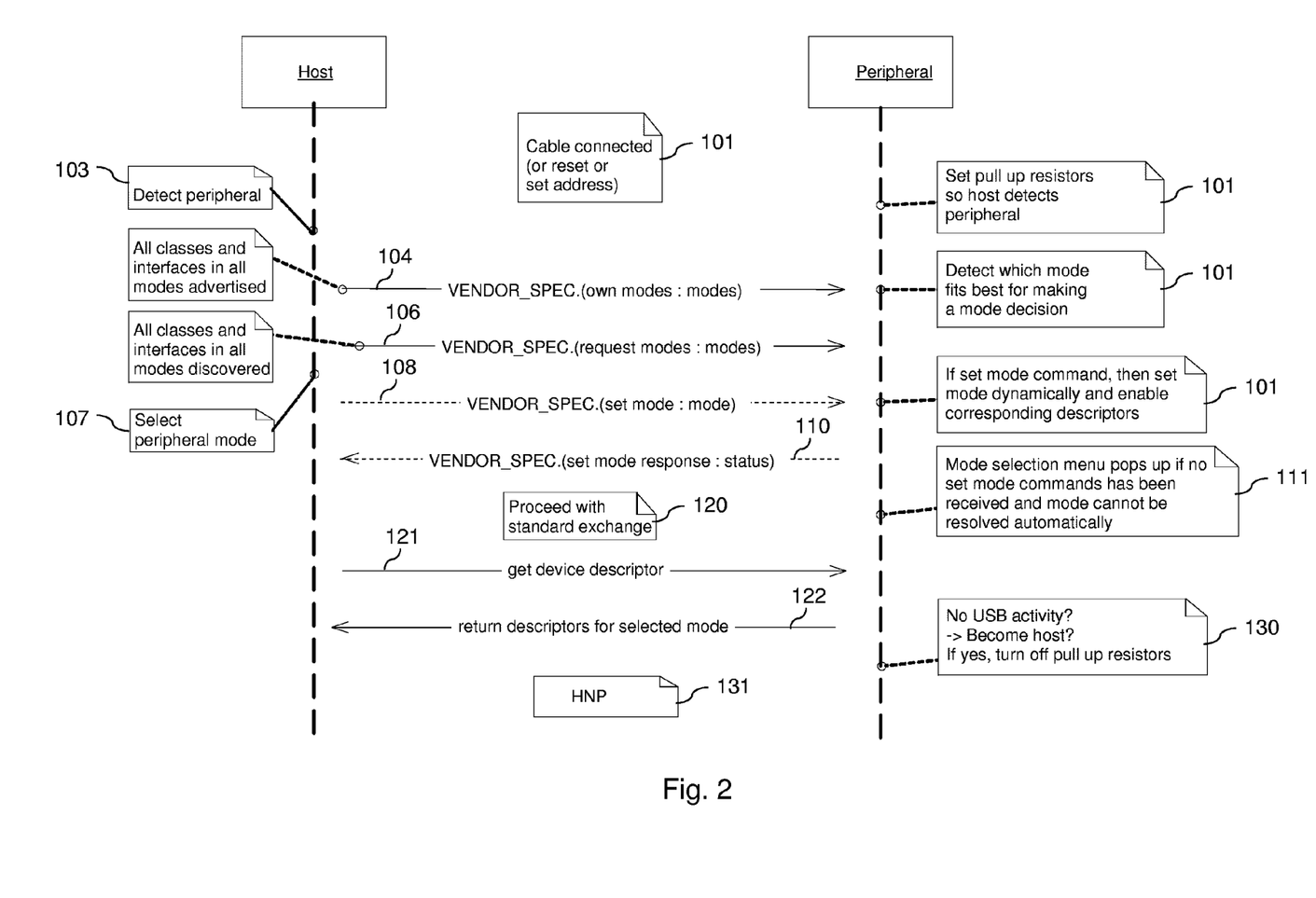
FIG. 2 is an exemplary message flow chart in the system of FIG. 1.

The chart of FIG. 2 presents the message flow between a host depicted on the left hand side and a peripheral depicted on the right hand side. It has to be noted that the Figure presents only the USB transaction level, not the associated data, which is transmitted via the USB. The normal USB flow is token packet, optional data packet and handshake packet.

At first, a USB connection is established between the mobile terminal 10 and the digital camera 20 (step 101). The connection can be established for instance by means of a cable, where the mobile terminal 10 is defined to be a host by connecting a Mini-A plug of the cable to the Mini-AB receptacle 14, and where the digital camera 20 is defined to be a peripheral by connecting a Mini-B plug of the cable to the Mini-AB receptacle 24.

The connection detector portion 27 of the digital camera 20 detects the USB connection and the assigned role of a peripheral, and sets the pull up resistors associated to the USB to enable a host to detect the peripheral (step 102).

The connection detector portion 17 of the mobile terminal 10 detects the USB connection and the assigned role of a host, and detects the digital camera 20 as a peripheral due to the set pull up resistors (step 103).

The vendor specific command manager 18 then generates a first VENDOR_SPECIFIC command, which comprises an indication of all classes and all interfaces that are supported in all USB modes of the mobile terminal 10. Advantageously, this informative command is sent in the beginning, but it has to be noted that it could also be sent at any later point of time. The informative command is transmitted via the USB 13, the Mini-AB receptacle 14 and the cable connection to the digital camera 20 (step 104). Thereby the mobile terminal 10 advertises its own USB capabilities to the digital camera 20.

The digital camera 20 receives the informative command via the Mini-AB receptacle 24 and forwards it via the USB 23 to the chipset 21. Based on the indication in the informative command, the digital camera 20 knows now what classes and interfaces the mobile terminal 10 supports. In the chipset 21, a mode selection logic of the vendor specific command manager portion 28 detects which one of the USB modes of the digital camera 20 fits best to the USB capabilities of the mobile terminal 10. The vendor specific command manager portion 28 further takes care that the received command is acknowledged (not shown) and that the digital camera 20 is set to the selected USB mode (step 105). Such a selection may not be possible, in case the indicated USB functionalities of the host 10 are suited to make use of several USB modes of the peripheral 20, or in case the peripheral 20 does not provide any USB functions for the specific kind of host 10. In the present case, for instance, the mobile terminal 10 might support a "print mode" for requesting a connected peripheral printer to provide a printout, and an "internal mass storage mode" enabling some host to access a mass storage of the mobile terminal 10. The digital camera 20 might equally support an "internal mass storage mode" enabling some host, like a PC, to access a mass storage of the digital camera 20, and an "external mass storage mode" for requesting image data to be stored in some peripheral offering a mass storage. Thus, the digital camera 20 might not detect any USB mode in which it could offer some function to the mobile terminal 10. It is to be understood, however, that the mobile terminal 10 and the digital camera could be adapted to enter one or more other USB modes, in which the digital camera 20 could offer some function to the mobile terminal 10.

The vendor specific command manager portion 18 further generates a second VENDOR_SPECIFIC command for retrieving all classes and all interfaces that are supported in all USB modes of the digital camera 20. This request command is transmitted via the USB 13, the Mini-AB receptacle 14 and the cable to the digital camera 20 (step 106).

The digital camera 20 receives the request command via the Mini-AB receptacle 24 and forwards it via the USB 23 to the chipset 21. In the chipset 21, the vendor specific command manager portion 28 takes care that the requested information can be retrieved by the mobile terminal 10.

The mobile terminal 10 discovers in this way all classes and all interfaces in all USB modes supported by the digital camera 20, not only the services that are provided in a current USB mode of the digital camera 20.

The vendor specific command manager portion 18 may now determine, based on the received information about the functionalities of the digital camera 20, which USB mode of the digital camera 20 is suited best for current requirements of the mobile terminal 10 on USB services. In case such a USB mode can be determined, the vendor specific command manager portion 18 further generates a third VENDOR_SPE- CIFIC command for forcing the USB mode of the digital camera 20 to enter this specific USB mode (step 107). This set command is equally transmitted via the USB 13, the Mini-AB receptacle 14 and the cable to the digital camera 20 (step 108).

The digital camera 20 receives the set command as well via the Mini-AB receptacle 24 and forwards it via the USB 23 to the chipset 21. In the chipset 21, the mode selection logic of the vendor specific command manager portion 28 takes care that the digital camera 20 is set to the USB mode requested in the set command (step 109). The vendor specific command manager portion 28 further generates a VENDOR_SPECIFIC message with corresponding status information about the set USB mode, which is transmitted reversely compared to the set command to the mobile terminal 10 (step 110).

In case no set command is received, the mode selection logic of the vendor specific command manager portion 28 may take care that a default USB mode is entered. It has to be noted, though, that also other approaches could be implemented for the case that no set command is received, but they might require a change of the tests for qualification defined in the USB specification. In FIG. 2, it is indicated for example that in case no set command is received after a predetermined time and no USB mode has been selected in step 105, the mode selection logic of the vendor specific command manager portion 28 take care that a USB mode or service selection menu is presented to the user on the display of the user interface 22 of the digital camera 20. The user may select a desired USB mode by entering a command via the buttons of the user interface 22 (step 111).

The USB mode or modes in all vendor specific commands can be identified simply by a unique number to distinguish the class sets.

Once the mobile terminal 10 has forced the digital camera 20 to a desired USB mode—or in case no setting of a USB mode is desired, once the mobile terminal 10 has discovered all USB functions offered by the digital camera 20—, the system proceeds with the standard USB operation (step 120).

That is, the standard control and data flow manager portion 19 of the mobile terminal 10 generates a Get Device Descriptor command, which is transmitted to the digital camera 20 (step 121).

When the Get Device Descriptor command is sent from the mobile terminal 10 to the digital camera 20, the discovery phase according to the invention is terminated. It is to be understood that the order of the generation and transmission of VENDOR_SPECIFIC commands used for this discovery process can be selected freely. Advantageously, they are completed before the Get Device Descriptor command is transmitted, though.

Upon receipt of the Get Device Descriptor command, the standard flow manager portion 29 of the digital camera 20 returns the descriptor for the entered USB mode, including the classes and interfaces supported in this USB mode (step 122). A descriptor is a data structure with a defined format, which is used by USB peripherals for reporting their attributes. The standard control and data flow manager 19 may then proceed with the desired data exchange.

If no discovery by means of VENDOR_SPECIFIC commands has been carried out by the mobile terminal 10 before the Get Device Descriptor command is received from the mobile terminal 10, the digital camera 20 can execute a default behavior, which may correspond to the standardized USB behavior.

It is to be noted that the operation described so far could also be carried out by a host having a Standard A or a Mini-A receptacle and a peripheral having a Standard B or a Mini-B receptacle. In the case, the USB-OTG software 16 or USB-OTG processing circuit 26 could be a general USB software 16 or USB processing circuit 26 realizing the described functions.

The Mini-AB receptacles 14, 24 are required for the case that host and peripheral are to be able to switch their role.

The digital camera 20 could take the role of a host and the mobile terminal 10 could take the role of a peripheral from the very beginning by reversing the connection between the Mini-AB receptacles, that is, by connecting the Mini-A plug of the cable to the digital camera 20 and the Mini-B plug to the mobile terminal 10. In this case, the steps 103 to 122 described with reference to FIG. 2 would simply be carried out with switched roles by mobile terminal 10 and digital camera 20.

Alternatively, the initial roles could be switched without reversing the cable connection.

In case the mobile terminal 10 does not want to make use of any USB service offered by the digital camera 20 or in case the mobile terminal 10 has completed making use of such a USB service, the digital camera 20 will detect that there is no more ongoing activity on the USB 23. After a predetermined time during which the USB 23 has been idle, the digital camera 20 may decide that it could make use of a USB service offered by the mobile terminal 10. To this end, the digital camera 20 may present the indicated capabilities of the mobile terminal 10 to the user via the display of the user interface 22 and enable a selection of a desired service via the buttons of the user interface 22. Upon a user selection, the role of host and peripheral may then be switched in accordance with the Host Negotiation Protocol described in the above mentioned On-The-Go Supplement to the USB 2.0 Specification, starting off with the digital camera 20 turning off its pull-up registers (steps 130, 131).

In case there is a reset of the USB connection or in case a new USB address is set for one of the devices 10, 20, the same operations may be carried out as for a new connection (steps 101-130).

On the whole, it becomes apparent that the presented embodiment of the invention enables host and peripheral of a USB connection to obtain knowledge of the entire USB capabilities of one another during the first connection setup or after a change in the connection, which may be hidden without the described discovery procedure. As a result, the peripheral may be enabled to select a suitable USB mode automatically and/or the host may be enabled to force the peripheral to enter a suitable USB mode. The need for a user action can thus be minimized, which also prevents unsuitable user selections, resulting in better ergonomic device design. Specifically for USB-OTG, an initial peripheral is further able to evaluate the capabilities of the initial host.

While the informative command, the request command, the set command and the confirmation message have been indicated to be vendor specific messages, it is to be understood that they could equally be standardized messages.

It is to be noted that the described embodiment constitutes only one of a variety of possible embodiments of the invention.

The invention claimed is:

1. A method comprising:
   generating at a host, which is connected via a serial bus interface of said host to a peripheral, an informative command, said informative command including information on capabilities of said host;
   providing said informative command for transmission via said serial bus interface to said peripheral;
   generating at said host a request command, said request command retrieving information on all classes offered in all serial bus modes of said peripheral at the same time, wherein said peripheral includes a plurality of different serial bus modes and wherein classes offered by each of the plurality of different serial bus modes differ by at least one class as between at least two of the plurality of different serial bus modes; and providing said request command for transmission via said serial bus interface to said peripheral.

2. The method according to claim 1, wherein said information on capabilities of said host include at least one of
an indication of at least one class supported in at least one serial bus mode of said host; and
an indication of at least one interface offered for at least one serial bus mode of said host.

3. The method according to claim 1, wherein said informative command is generated at said host before a get command is generated, said get command being generated at said host for obtaining information on at least one class offered by said peripheral in a current serial bus mode of said peripheral.

4. The method according to claim 1, further comprising:
selecting at said host a desired serial bus mode of said peripheral based on said retrieved information on all classes offered in all serial bus modes of said peripheral;
generating at said host a set command for forcing said peripheral into a selected serial bus mode; and
providing said set command for transmission via said serial bus interface to said peripheral.

5. A method comprising:
receiving at a peripheral an informative command from a host including information on capabilities of said host, said peripheral being connected via a serial bus interface of said peripheral to said host, and
receiving at said peripheral a request command retrieving information on all classes offered in all serial bus modes of said peripheral at the same time, wherein said peripheral includes a plurality of different serial bus modes and wherein classes offered by each of the plurality of different serial bus modes differ by at least one class as between at least two of the plurality of different serial bus modes.

6. The method according to claim 5, further comprising at said peripheral entering a selected serial bus mode, which selected serial bus mode is selected based on one of:
said information on capabilities of said host;
a set command from said host for forcing said peripheral into a particular serial bus mode; and
a user input.

7. The method according to claim 5, further comprising determining at said peripheral whether to become a host itself based on said information on capabilities of said current host.

8. An apparatus comprising:
a processor,
memory including computer program code,
the memory and the computer program code configured to, with the processor, cause the apparatus to perform:
generating an informative command including information on capabilities of a host, which is connected via a serial bus interface of said host to a peripheral;
providing said command for transmission via said serial bus interface to said peripheral;
generating at said host a request command, said request command retrieving information on all classes offered in all serial bus modes of said peripheral at the same time, wherein said peripheral includes a plurality of different serial bus modes and wherein classes offered by each of the plurality of different serial bus modes differ by at least one class as between at least two of the plurality of different serial bus modes; and
providing said request command for transmission via said serial bus interface to said peripheral.

9. A device comprising:
a serial bus interface enabling said device to act as a host in a serial bus connection with another device acting as a peripheral; and
an apparatus according to claim 8.

10. A system comprising a device according to claim 9 and a further device acting as said peripheral.

11. The apparatus according to claim 8, wherein said information on capabilities of said host include at least one of
an indication of at least one class supported in at least one serial bus mode of said host; and
an indication of at least one interface offered for at lest one serial bus mode of said host.

12. The apparatus according to claim 8, wherein the memory and the computer program code is further configured to, with the processor, cause the apparatus to perform:
generating a get command for obtaining information on at least one class offered by said peripheral in a current serial bus mode of said peripheral, and
generating said informative command at said host before generating said get command.

13. The apparatus according to claim 8,
wherein the memory and the computer program code are further configured to, with the processor, cause the apparatus to perform:
selecting a desired serial bus mode of said peripheral based on said retrieved information on all classes offered in all serial bus modes of said peripheral;
generating a set command for forcing said peripheral into a selected serial bus mode; and
providing said command for transmission via said serial bus interface to said peripheral.

14. An apparatus comprising:
a processor;
memory including computer program code,
the memory and the computer program code configured to, with the processor, cause the apparatus to perform:
receiving at a peripheral an informative command from a host including information on capabilities of said host, said peripheral being connected via a serial bus interface of said peripheral to said host; and
receiving at said peripheral a request command retrieving information on all classes offered in all serial bus modes of said peripheral at the same time, wherein said peripheral includes a plurality of different serial bus modes and wherein classes offered by each of the plurality of different serial bus modes differ by at least one class as between at least two of the plurality of different serial bus modes.

15. A device comprising:
a serial bus interface enabling said device to act as a peripheral in a serial bus connection to another device acting as a host; and
an apparatus according to claim 14.

16. The apparatus according to claim 14, wherein the memory and the computer program code are further configured to, with the processor, cause the apparatus to perform entering a selected serial bus mode, which selected serial bus mode is selected based on one of:
said information on capabilities of said host;
a set command from said host for forcing said peripheral into a particular serial bus mode; and
a user input.

17. The apparatus according to claim 14, wherein the memory and the computer program code are further configured to, with the processor, cause the apparatus to perform determining whether said peripheral is to become a host itself based on said information on capabilities of said current host.

18. A non-transitory computer readable memory stored with code, which when executed by a processing unit of a host connected via a serial bus interface of said host to a peripheral, causes said host to perform:
  generating an informative command, said informative command including information on capabilities of said host;
  providing said informative command for transmission via said serial bus interface to said peripheral;
  generating at said host a request command, said request command retrieving information on all classes offered in all serial bus modes of said peripheral at the same time, wherein said peripheral includes a plurality of different serial bus modes and wherein classes offered by each of the plurality of different serial bus modes differ by at least one class as between at least two of the plurality of different serial bus modes; and
  providing said request command for transmission via said serial bus interface to said peripheral.

19. A non-transitory computer readable memory stored with code, which when executed by a processing unit of a peripheral, causes said peripheral to perform:
  receiving an informative command from a host including information on capabilities of said host, said peripheral being connected via a serial bus interface of said peripheral to said host; and
  receiving at said peripheral a request command retrieving information on all classes offered in all serial bus modes of said peripheral at the same time, wherein said peripheral includes a plurality of different serial bus modes and wherein classes offered by each of the plurality of different serial bus modes differ by at least one class as between at least two of the plurality of different serial bus modes.

20. A method comprising:
  generating at a host, which is connected via a serial bus interface of said host to a peripheral, a request command, said request command retrieving information on all classes offered in all serial bus modes of said peripheral at the same time, wherein said peripheral includes a plurality of different serial bus modes and wherein classes offered by each of the plurality of different serial bus modes differ by at least one class as between at least two of the plurality of different serial bus modes; and
  providing said request command for transmission via said serial bus interface to said peripheral.

21. The method according to claim 20, further comprising:
  selecting at said host a desired serial bus mode of said peripheral based on said retrieved information on all classes offered in all serial bus modes of said peripheral;
  generating at said host a set command for forcing said peripheral into a selected serial bus mode; and
  providing said set command for transmission via said bus interface to said peripheral.

22. An apparatus comprising
  a processor,
  memory including computer program code,
  the memory and the computer program code configured to, with the processor, cause the apparatus to perform:
  generating at a host, which is connected via a serial bus interface of said host to a peripheral, a request command, said request command retrieving information on all classes offered in all serial bus modes of said peripheral at the same time, wherein said peripheral includes a plurality of different serial bus modes and wherein classes offered by each of the plurality of different serial bus modes differ by at least one class as between at least two of the plurality of different serial bus modes; and
  providing said request command for transmission via said serial bus interface to said peripheral.

23. A device comprising:
  a serial bus interface enabling said device to act as a host in a serial bus connection with another device acting as a peripheral; and
  an apparatus according to claim 22.

24. A system comprising a device according to claim 23 and a further device acting as said peripheral.

25. The apparatus according to claim 22,
  wherein the memory and the computer program code are further configured to, with the processor, cause the apparatus to perform:
  selecting a desired serial bus mode of said peripheral based on said retrieved information on all classes offered in all serial bus modes of said peripheral;
  generating a set command for forcing said peripheral into a selected serial bus mode; and
  providing said set command for transmission via said serial bus interface to said peripheral.

26. A non-transitory computer readable memory stored with code, which when executed by a processing unit of a host connected via a serial bus interface of said host to a peripheral, causes said host to perform:
  generating at a host a request command, said request command retrieving information on all classes offered in all serial bus modes of said peripheral at the same time, wherein said peripheral includes a plurality of different serial bus modes and wherein classes offered by each of the plurality of different serial bus modes differ by at least one class as between at least two of the plurality of different serial bus modes; and
  providing said request command for transmission via said serial bus interface to said peripheral.

27. An apparatus comprising:
  means for generating at a host, which is connected via a serial bus interface of said host to a peripheral, an informative command, said informative command including information on capabilities of said host;
  means for providing said informative command for transmission via said serial bus interface to said peripheral;
  means for generating at said host a request command, said request command retrieving information on all classes offered in all serial bus modes of said peripheral at the same time, wherein said peripheral includes a plurality of different serial bus modes and wherein classes offered by each of the plurality of different serial bus modes differ by at least one class as between at least two of the plurality of different serial bus modes; and
  means for providing said request command for transmission via said serial bus interface to said peripheral.

28. An apparatus comprising:
  means for receiving at a peripheral an informative command from a host including information on capabilities of said host, said peripheral being connected via a serial bus interface of said peripheral to said host; and
  means for receiving at said peripheral a request command retrieving information on all classes offered in all serial bus modes of said peripheral at the same time, wherein said peripheral includes a plurality of different serial bus modes and wherein classes offered by each of the plurality of different serial bus modes differ by at least one class as between at least two of the plurality of different serial bus modes.

29. An apparatus comprising:
means for generating at a host, which is connected via a serial bus interface of said host to a peripheral, a request command, said request command retrieving information on all classes offered in all serial bus modes of said peripheral at the same time, wherein said peripheral includes a plurality of different serial bus modes and wherein classes offered by each of the plurality of different serial bus modes differ by at least one class as between at least two of the plurality of different serial bus modes; and
means for providing said request command for transmission via said serial bus interface to said peripheral.

* * * * *